US012659766B2

(12) United States Patent
Vasseur et al.

(10) Patent No.: US 12,659,766 B2
(45) Date of Patent: Jun. 16, 2026

(54) SAVING ENERGY IN WIRELESS NETWORKS WHILE PRESERVING USER QUALITY OF EXPERIENCE

(71) Applicant: Cisco Technology, Inc., San Jose, CA (US)

(72) Inventors: Jean-Philippe Vasseur, Saint Martin d'Uriage (FR); Pascal Thubert, Roquefort les Pins (FR); Eric M. Levy-Abegnoli, Valbonne (FR); Patrick Wetterwald, Mouans Sartoux (FR); Jerome Henry, Pittsboro, NC (US)

(73) Assignee: Cisco Technology, Inc., San Jose, CA (US)

( * ) Notice: Subject to any disclaimer, the term of this patent is extended or adjusted under 35 U.S.C. 154(b) by 241 days.

(21) Appl. No.: 18/358,674

(22) Filed: Jul. 25, 2023

(65) Prior Publication Data

US 2025/0039688 A1     Jan. 30, 2025

(51) Int. Cl.
| | |
|---|---|
| *H04W 24/02* | (2009.01) |
| *H04W 24/08* | (2009.01) |
| *H04W 28/02* | (2009.01) |
| *H04W 52/02* | (2009.01) |

(52) U.S. Cl.
CPC ........... *H04W 24/02* (2013.01); *H04W 24/08* (2013.01); *H04W 28/0268* (2013.01); *H04W 52/0206* (2013.01)

(58) Field of Classification Search
CPC . H04W 24/02; H04W 24/08; H04W 28/0268; H04W 52/0206; Y02D 30/70; H04L 41/16; H04L 43/08; H04L 43/0876; H04L 43/16; H04L 41/5019
See application file for complete search history.

(56) References Cited

U.S. PATENT DOCUMENTS

| | | |
|---|---|---|
| 2009/0268684 A1 | 10/2009 | Lott et al. |
| 2013/0142043 A1 | 6/2013 | Tapia et al. |
| 2015/0173084 A1 | 6/2015 | Chou et al. |
| 2015/0180800 A1 | 6/2015 | Vasseur |

(Continued)

OTHER PUBLICATIONS

Bayer N., et al., "Load-Adaptive Networking for Energy-Efficient Wireless Access", Computer Communications, Elsevier Science Publishers Bv, Amsterdam, NL, vol. 72, May 29, 2015, 9 Pages, XP029328681, ISSN:0140-3664, DOI:10.1016/J.COMCOM.2015.05.004, Section 3.2.1.

(Continued)

*Primary Examiner* — Shawn D Miller
(74) *Attorney, Agent, or Firm* — Patterson + Sheridan, LLP

(57) ABSTRACT

Systems and techniques for dynamically optimizing a wireless network topology to minimize energy consumption while preserving user quality of experience (QoE) are described. An example technique includes determining a set of applications that have a target service level agreement (SLA). Network traffic is monitored from the set of applications being executed by one or more client STAs within a network. A topology of the network is dynamically adapted to reduce an amount of energy consumption in the network while maintaining a threshold amount of the network traffic that satisfies the target SLA, based on monitoring the network traffic.

20 Claims, 6 Drawing Sheets

(56)         References Cited

U.S. PATENT DOCUMENTS

| | | | |
|---|---|---|---|
| 2017/0238258 A1* | 8/2017 | Ramalho de Oliveira ................. H04W 52/0261 455/574 |
| 2019/0150080 A1* | 5/2019 | Davies .................. H04W 48/20 370/329 |
| 2020/0383048 A1 | 12/2020 | Tellado et al. |
| 2021/0099854 A1* | 4/2021 | Tran ...................... H04W 8/005 |
| 2021/0367892 A1 | 11/2021 | Young et al. |
| 2023/0080537 A1* | 3/2023 | Ramanathan ....... H04L 47/2475 709/238 |

OTHER PUBLICATIONS

International Search Report and Written Opinion for International
Application No. PCT/US2024/038726, mailed Oct. 29, 2024, 16
Pages.
Rouskas A., et al., "Green Optimization Schemes for Mobile
Network Design and Operation", Wireless Personal Communica-
tions, Springer, Dordrecht, NL, vol. 96, No. 2, May 20, 2017, pp.
3227-3247, XP036308445, 21 Pages, ISSN: 0929-6212, DOI: 10.1007/
S11277-017-4350-9, Section 4.

* cited by examiner

SAVING ENERGY IN WIRELESS NETWORKS WHILE PRESERVING USER QUALITY OF EXPERIENCE

TECHNICAL FIELD

Embodiments presented in this disclosure generally relate to wireless communications. More specifically, embodiments disclosed herein relate to systems and techniques for dynamically optimizing a wireless network topology to minimize energy consumption while preserving user quality of experience.

BACKGROUND

Wireless communication standards, such as the Institute of Electrical and Electronics Engineers (IEEE) 802.11 technical standard, are continuing to evolve to meet the ever increasing demands of bandwidth intensive and low latency services, such as augmented/extended reality and cloud gaming. For example, recent amendments to IEEE 802.11 (e.g., IEEE 802.11be amendment and later amendments) aim to introduce higher data rates using higher modulation orders, larger channel widths, and additional spatial streams, as well as a set of new features such as multi-link operation (MLO) and multi-access point coordination (MAPC), as illustrative examples.

MLO enables devices, such as access points (APs) and client stations (STAs), to simultaneously send and receive data across different frequency bands and channels. With MLO, multiple links can be established between the client STA and the same or different AP to increase throughput, reduce latency, and improve reliability. MLO thus enables a multi-link AP logical entity and a multi-link non-AP logical entity to use multiple paths for user plane traffic. MAPC allows an AP that wins contention to share its transmit opportunity (TXOP) with its peer APs and also allows the contention-winning AP to coordinate the available temporal, frequency, and spatial resources for the peer APs, improving the wireless performance in terms of throughput and latency.

In addition to new features, such as MLO and MAPC, the next generation of IEEE 802.11 (e.g., WiFi 8) aims to support various enhancements for latency sensitive traffic including, for example, time sensitive networking (TSN) improvements, physical layer convergence protocol (PLCP) protocol data unit (PPDU) preemption, and aggregated PPDUs (APPDUs) (or A-PPDUs). The next generation of IEEE 802.11 may be used to support low latency use cases, including augmented reality (AR)/virtual reality (VR), industrial automation, and mass deployment of Internet of Things (IoT) devices, as illustrative examples.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1:
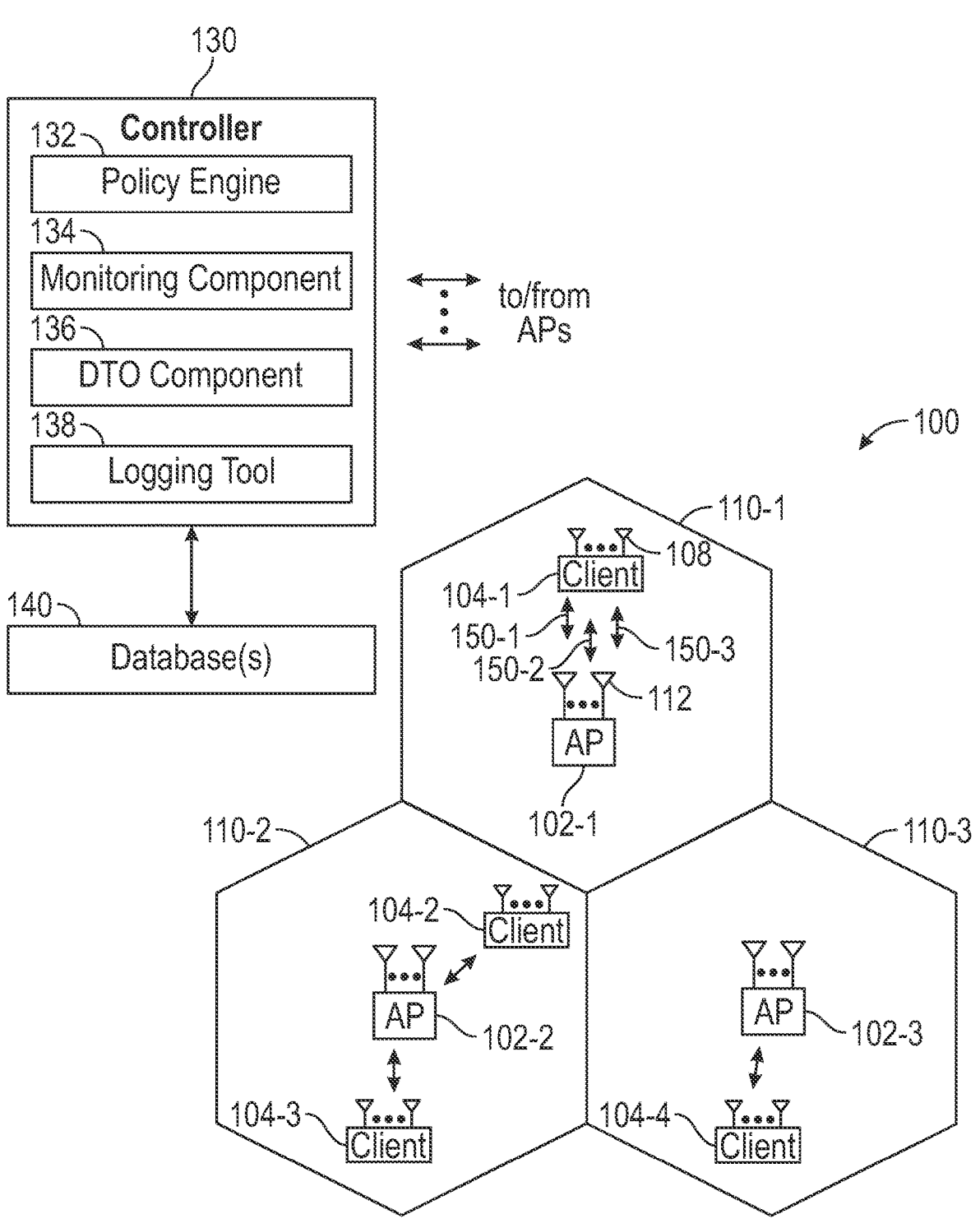
FIG. 1 illustrates an example system, according to one embodiment.

One embodiment described herein is a computer-implemented method. The computer-implemented method includes determining a set of applications that have a target service level agreement (SLA). The computer-implemented method also includes monitoring network traffic from the set of applications being executed by one or more client stations (STAs) within a network. The computer-implemented method further includes dynamically adapting a topology of the network to reduce an amount of energy consumption in the network while maintaining a threshold amount of the network traffic that satisfies the target SLA, based on monitoring the network traffic.

Another embodiment described herein is a computing device. The computing device includes memory and a processor communicatively coupled to the memory. The processor is configured to perform an operation. The operation includes determining a set of applications that have a target service level agreement (SLA). The operation also includes monitoring network traffic from the set of applications being executed by one or more client stations (STAs) within a network. The operation further includes dynamically adapting a topology of the network to reduce an amount of energy consumption in the network while maintaining a threshold amount of the network traffic that satisfies the target SLA, based on monitoring the network traffic.

Another embodiment described herein is a computer-readable storage medium. The computer-readable storage medium includes computer executable code, which when executed by one or more processors, performs an operation. The operation includes determining a set of applications that have a target service level agreement (SLA). The operation also includes monitoring network traffic from the set of applications being executed by one or more client stations (STAs) within a network. The operation further includes dynamically adapting a topology of the network to reduce an amount of energy consumption in the network while maintaining a threshold amount of the network traffic that satisfies the target SLA, based on monitoring the network traffic.

EXAMPLE EMBODIMENTS

Certain wireless systems (e.g., IEEE 802.11be and later) may support a variety of different enhanced features (e.g., MLO, MAPC, latency sensitive traffic enhancements, etc.) to provide higher data rates, reduced latency, and other performance benefits. However, while such features have allowed for faster transmission rates, the emergence of faster transmission rates has generally resulted in increased AP densities within a given environment. In many cases, for example, a network operator may be unable to determine, a priori, the number of APs to deploy within an environment (e.g., building lobby, stadium, or other indoor/outdoor environment). As such, network operators generally deploy a larger than needed set of APs in an environment in order to meet the target service level agreement (SLA) for client STAs, where the target SLA includes target performance criteria for various metrics, such as throughput, latency, jitter, modulation and coding scheme (MCS), and packet loss, as illustrative, non-limiting examples. For example, it may be common to have a highly dense deployment of APs in certain environments (e.g., building) even at times where a significant number of the APs do not have any active client STAs associated.

One issue with large AP deployments is that such deployments may consume a significant amount of energy. Accordingly, as sustainability and the impact of energy consumption on the climate are increasingly becoming urgent issues for the wireless industry, it may be desirable to provide techniques for reducing energy consumption in wireless systems that support enhanced features.

Embodiments described herein provide systems, devices, and techniques for dynamically optimizing a wireless network topology to minimize energy consumption while preserving user quality of experience (QoE). As described herein, in certain embodiments, a system can dynamically adapt a wireless network topology by powering off (or reducing the power of) one or more APs deployed within an environment while maintaining a target SLA for one or more client STAs being served by the one or more APs. By adapting the wireless network topology in this manner, embodiments described herein can significantly reduce the energy consumption of the wireless network without compromising the performance of applications running on the client STAs.

Note, the techniques described herein for dynamically optimizing a wireless network topology may be incorporated into (such as implemented within or performed by) a variety of wired or wireless apparatuses (such as nodes). In some implementations, a node includes a wireless node. Such wireless nodes may provide, for example, connectivity to or for a network (such as a wide area network (WAN) such as the Internet or a cellular network) via a wired or wireless communication link. In some implementations, a wireless node may include an AP or a controller.

As used herein, a hyphenated form of a reference numeral refers to a specific instance of an element and the un-hyphenated form of the reference numeral refers to the collective element. Thus, for example, device "12-1" refers to an instance of a device class, which may be referred to collectively as devices "12" and any one of which may be referred to generically as a device "12".

FIG. 1 illustrates an example system 100 in which one or more techniques described herein can be implemented, according to one embodiment. As shown, the system 100 includes one or more APs (e.g., AP 102-1, AP 102-2, and AP 102-3), one or more client STAs (e.g., client STA 104-1, client STA 104-2, client STA 104-3, and client STA 104-4), a controller 130, and one or more databases 140. An AP is generally a fixed station that communicates with client STA(s) and may be referred to as a base station, wireless device, or some other terminology. A client STA may be fixed or mobile and also may be referred to as a mobile STA, a client, a STA, a wireless device, or some other terminology. Note that while a certain number of APs and client STAs are depicted, the system 100 may include any number of APs and client STAs.

As used herein, an AP along with the STAs associated with the AP (e.g., within the coverage area (or cell) of the AP) may be referred to as a basic service set (BSS). Here, AP 102-1 within cell 110-1 is the serving AP for client STA 104-1, AP 102-2 within cell 110-2 is the serving AP for client STAs 104-2 and 104-3, and AP 102-3 within cell 110-3 is the serving AP for client STA 104-4. The AP 102-1, AP 102-2, and AP 102-3 are neighboring (peer) APs. The APs 102 may communicate with one or more client STAs 104 on the downlink and uplink. The downlink (e.g., forward link) is the communication link from the AP 102 to the client STA(s) 104, and the uplink (e.g., reverse link) is the communication link from the client STA(s) 104 to the AP 102. In some cases, a client STA may also communicate peer-to-peer with another client STA.

As shown in FIG. 1, each client STA 104 includes one or more radios 108. The client STA 104 can use one or more of the radios 108 to form links 150 with an AP 102. As also shown, each AP 102 includes one or more radios 112 that the AP 102 can use to form links 150 with one or more client STAs 104. In general, the AP(s) 102 and the client STA(s) 104 may form any suitable number of links 150 for communication using any suitable frequencies or bands.

In some instances, a client STA 104 may form multiple links 150 with a single AP 102. For example, a client STA 104-1 can use a first radio 108-1 operating on a first band (e.g., 5 GHz band) to establish a first link 150-1 with AP 102-1, a second radio 108-2 operating on a second band (e.g., 6 GHz band) to establish a second link 150-2 with the AP 102-1, a third radio 108-3 operating on a third band (e.g., 2.4 GHz band) to establish a third link 150-3 with the AP 102-1, and so on.

In some instances, a client STA may form multiple links 150 across multiple APs 102. For example, a client STA 104-1 can use a first radio 108-1 operating on a first band (e.g., 5 GHz band) to establish a first link with AP 102-1 and use a second radio 108-2 operating on a second band (e.g., 6 GHz band) to establish a second link with AP 102-2. In general, each client STA 104 may establish multiple communication links across one or more APs 102. Similarly, each AP 102 may establish multiple communication links across one or more client STAs 104. Example hardware that may be included in an AP 102 is discussed in greater detail in regard to FIG. 6.

The controller 130 couples to and provides coordination and control for the APs 102 1-3. For example, the controller 130 may handle adjustments to RF power, power on/power off control, channels, authentication, and security for the APs. The controller 130 may also assign and coordinate the links 150 formed by the client STA(s) 104 with the APs 102. In certain embodiments described herein, the controller 130 can dynamically adjust the network topology of the system 100 by powering on/powering off a number of APs 102 in one or more cells 110 while maintaining a target SLA for client STAs 104 being served by the APs 102. As described below, the dynamic adjustment may be performed on a per radio 112, per AP 102 basis.

As shown, the controller 130 may be communicatively coupled to (or integrated with) one or more databases 140. The database(s) 140 are representative of storage systems that may include information on one or more communication links in the system 100. For example, the database(s) 140 may include different types of metrics, including application performance metrics (e.g., frame retransmission counters, jitter, latency, delay, etc.), communication link metrics (e.g., received signal strength indication (RSSI), modulation and coding scheme (MCS), etc.), AP load information (including real-time load information and historical load information), and AP power on/power off state information (including real-time and historical power on/power off state information), as illustrative, non-limiting examples.

In certain embodiments, the controller 130 is included within or integrated with an AP 102 and coordinates the links 150 formed by that AP 102 (or otherwise provides control for that AP). For example, each AP 102 may include a controller that provides control for that AP. In certain embodiments, the controller 130 is separate from the APs 102 and provides control for those APs. In FIG. 1, for example, the controller 130 may communicate with the APs 102 1-3 via a (wired or wireless) backhaul. The APs 102 1-3 may also communicate with one another, e.g., directly or indirectly via a wireless or wireline backhaul. Example hardware that may be included in a controller 130 is discussed in greater detail with regard to FIG. 6.

Figure 2:
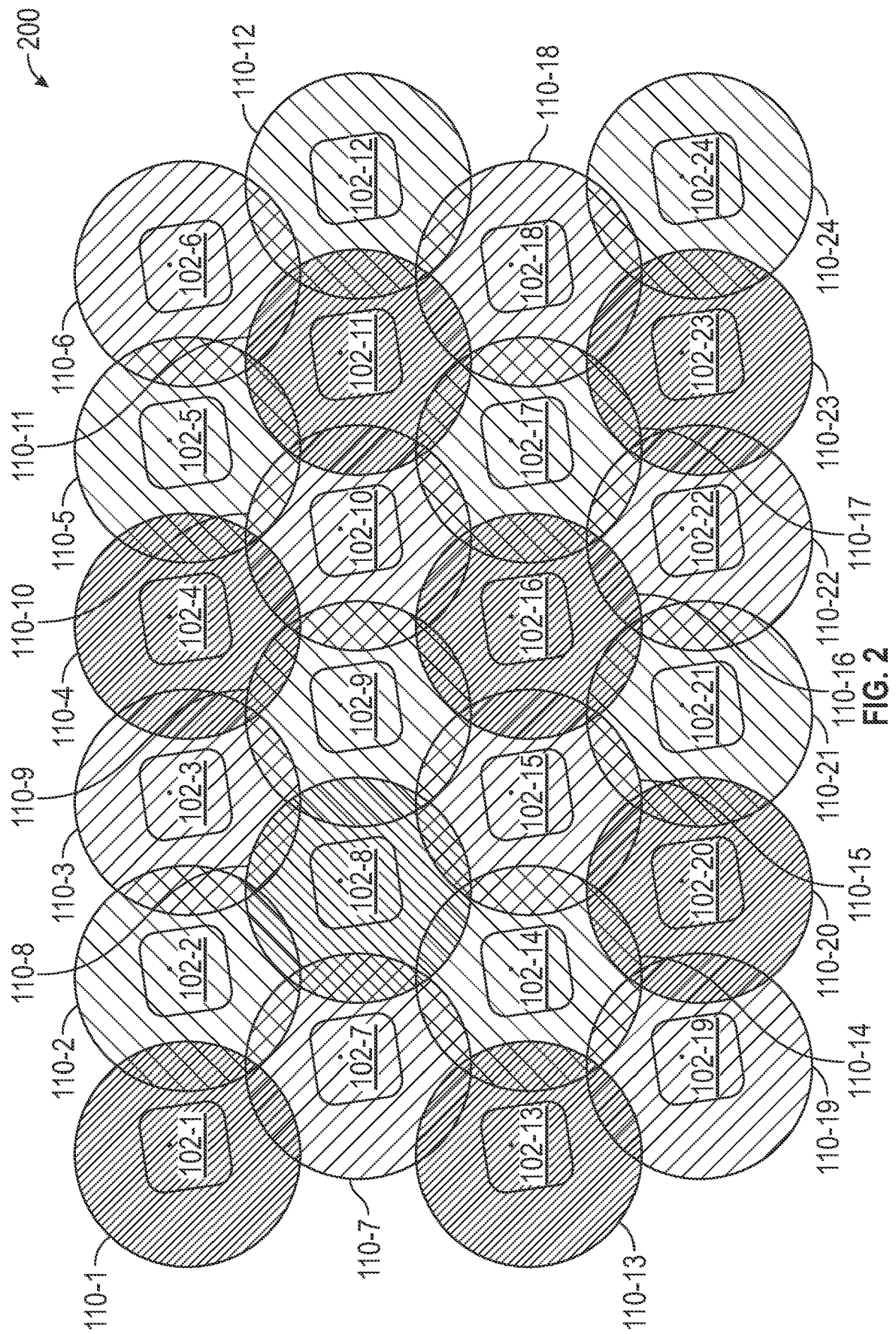
FIG. 2 illustrates an example wireless network topology, according to one embodiment.

As noted, one issue with current wireless networks is that they generally deploy a larger than necessary set of APs to serve client STAs(s) (and related client STA applications). Consider FIG. 2, which illustrates an example wireless network topology 200, according to one embodiment. The wireless network topology 200 includes APs 102 1-24, each serving one or more client STAs 104 (not shown) within a respective cell 110 of the AP 102. In many cases, a wireless network operator may deploy all of the APs 102 1-24 in a single environment (e.g., building lobby), regardless of whether all APs are necessary to meet the client STAs target SLA. For example, in many instances, all of the APs 102 within the network topology 200 may be powered on, even at times when a significant number of the APs do not have any active STAs associated with the APs. Such dense deployment of APs can result in significant amounts of power consumption, reducing the sustainability of the wireless network from an energy consumption standpoint.

To address this, the controller 230 includes logic for dynamically adapting the wireless topology of a network by dynamically powering off (or reducing the power of) one or more radios of one or more APs 102 deployed within an environment. The controller 230 may determine a number of the APs 102 to power off (or reduce the power of), based on a target SLA of one or more client STAs being served by the APs 102. Referring back to FIG. 1, the controller 230 includes a policy engine 132, a monitoring component 134, a dynamic topology optimization (DTO) component 136, and a logging tool 138, each of which can include hardware, software, or combinations thereof. Note that while FIG. 1 depicts the policy engine 132, monitoring component 134, DTO component 136, and logging tool 138 within the controller 130, in certain embodiments, one or more of these components may be included within an AP 102 acting as a primary AP for a given wireless network topology, such as wireless network topology 200.

In certain embodiments, the policy engine 132 determines a set of applications (running on the client STAs 104) that have target SLAs. As used herein, this determined set of applications may also be referred to as "applications of interest." In certain embodiments, the policy engine 132 may prioritize certain sets of applications during certain periods of time (e.g., hours, days, or some time period). In some cases, these different periods of time may be designated as "energy optimization cycles" for the wireless network. For example, for each period of time (or energy optimization cycle), the policy engine 132 may determine, from the set of applications that have target SLAs, a subset of applications for which the target SLAs have to be met during the time period.

In one reference example, a wireless network operator (e.g., network administrator) may determine that a given subset of applications have strict target SLAs (e.g., target SLAs that have to be met) and that another subset of applications may be allowed to experience performance degradation (e.g., due to the reduction of the number of active APs) in order to save energy. For instance, the policy engine 132 may output a policy that specifies that voice/ video should have its target SLA met at all times (or some other set of time periods), where the target SLA has an SLA template specified as the percentage of time (e.g., X %) that one or more network key performance indicators (KPIs) have to satisfy a predetermined threshold (e.g., "Delay"<150 milliseconds (ms) or some other threshold, "Jitter"<50 ms or some other threshold, "packet loss"<3% or some other threshold computed as average over a predefined number of time window durations). Note, however, that the aforementioned SLA template is merely one example of an SLA template that can be used and that other SLA templates may be used by the same or different applications. For example, the policy engine 132 may output a policy for an application (e.g., deterministic application) with the following target SLA: ("For a given application A1, delays should always be under D1 ms, . . . "). The policy engine 132 may provide an indication of the set of applications that have target SLAs to the monitoring component 134.

In certain embodiments, the monitoring component 134 actively monitors the SLA(s) for the set of applications indicated by the policy engine 132. The monitoring component 134 can use a variety of techniques to monitor the SLA(s) for a given set of applications. For example, in one embodiment, the monitoring component 134 uses deep packet inspection (DPI) to monitor the traffic for the applications of interest (indicated by the policy engine 132). DPI (also known as packet sniffing) is generally a method of inspecting and/or managing the content of network traffic (e.g., packets) within a network. DPI may involve various actions, such as alerting, blocking, re-routing, and logging, as illustrative, non-limiting examples. By using DPI, the monitoring component 134 can compute the networking KPI(s) and determine whether the target SLA(s) is met.

Note that, in certain instances, DPI may not be possible, such as in the case of encrypted traffic. Additionally, in certain instances, even when DPI is used, the monitoring component 134 may not be able to compute the end-to-end delay between the client STA and the destination (e.g., in the case of user datagram protocol (UDP) traffic). However, the monitoring component 134 may be able to compute the end-to-end delay between a client STA and destination using Application Response Time (ART) metrics for other traffic, such as transmission control protocol (TCP) traffic. Note that DPI may be implemented by the controller 130 or by a (primary) AP 102.

In another embodiment, the monitoring component 134 can use a distributed technique to monitor the traffic for the applications of interest (indicated by the policy engine 132). As part of the distributed technique, the monitoring component 134 may send a message to each client STA 104 requesting the client STA 104 to monitor the SLA for the set of applications of interest. For example, the monitoring component 134 may send a request to "Monitor KPIs $K_1$, $K_2$, . . . , $K_N$ for next T minutes and report values accordingly" (where T>0). Upon receiving an indication of the monitored KPI(s) from the client STAs, the monitoring component 134 can compute the percentage of time that the set of applications were within the target SLA, and thus the expected SLA for each of the set of applications.

In one embodiment, the messaging (of the aforementioned distributed technique) can be implemented as part of a stream classification service (SCS) dialog. For example, certain wireless systems may use a SCS to enable classification and quality of service (QoS) treatment of specific IP flows, including flows to and from cellular networks (e.g., 5G core networks), allowing sensitive traffic such as gaming, voice, and video to be prioritized over bulk data traffic. When a SCS is in place, the monitoring component 134 can augment the SCS dialog to allow for the aforementioned messages to be sent to the client STAs. For example, the AP can use the update or response message (within the SCS dialog) to add an information element (IE) with the elements of a message that requests client STAs to monitor KPIs. In another embodiment, the messaging (of the aforementioned distributed technique) can be implemented as part of the differentiated service code point (DSCP) policy sent from the AP. In yet another embodiment, this message may be implemented as an extension of an 802.11k request (e.g., requesting the client STA to monitor an application instead of monitoring a channel).

In certain embodiments, the DTO component 136 performs a DTO process, which involves determining the minimum network topology (MNT) that allows for maintaining the target SLA for the set of applications (indicated by the policy engine 132) while maximizing the number of APs 102 that can be powered off, thus minimizing the amount of energy consumption of the wireless network. In one embodiment, the DTO component 136 may be triggered based on a predetermined time period (e.g., once every hour, day, week, or some other time period). In another embodiment, the DTO component 136 may be triggered based on one or more predetermined events. Note the DTO process described herein may be performed for each radio of each AP.

One example of such an event may be based on the monitoring of the number of active client STAs (e.g., whether the number of active client STAs has increased above a threshold, whether the number of active client STAs have decreased below a threshold, or some other criteria). For instance, in many cases, the network operator may expect a smaller number of active client STAs within an environment (e.g., building lobby) outside of a certain time period (e.g., working hours). In such cases, if the controller 130 determines that the number of active client STAs is abnormally low (e.g., the number of active client STAs is below a predetermined threshold associated with a given time period), then the controller 130 may trigger the DTO component 136 to perform a DTO process for the wireless network. In some cases, the controller 130 may use a calendar-based mechanism to keep track of the average number of active STAs for one or more time periods.

Another example of such an event may be based on a number of active client STAs that are using the applications of interest (indicated by the policy engine 132). For example, if the controller 130 detects that a significant number of client STAs are not using the applications of interest (e.g., the number of active client STAs using the applications of interest is below a predetermined threshold), then the controller 130 may trigger the DTO component 136 to perform a DTO process for the wireless network. In these instances, the low number of active client STAs using the applications of interest may indicate that the number of APs that can be powered off can be increased. Note, in some cases, the predetermined threshold number of client STAs that use the applications of interest in a given time period may be based on historical information indicating the average number of client STAs that use the applications of interest over one or more time periods.

In certain embodiments, the DTO process is an iterative process, which involves initially assuming that the entire wireless network topology is active (e.g., assuming all APs are powered on). Then, at each subsequent step of the DTO process, the DTO component 136 can (i) determine which AP 102 to power off, based on at least one of the number of client STAs 104 associated with that AP, the overlap of the measured cells 110, or energy consumption on the AP (based on various set of parameters), as illustrative, non-limiting examples; (ii) request client STAs associated with the determined AP 102 to roam (e.g., using a 802.11 v BSS transition management (BTM) procedure), (iii) power off the determined AP 102, and (iv) request a new cycle of monitoring (e.g., via the monitoring component 134) to determine whether the target SLA(s) are still met for the applications of interest (indicated by the policy engine 132). The DTO component 136 may stop the process when the percentage of SLA degradation exceeds a predefined threshold (e.g., more than x client STAs for which y % of application traffic of interest is outside of the target SLA, where x and y≥0 and may be set by the network operator).

At each step of the iterative process, the controller 130 may monitor the total amount of energy consumed by each AP 102. In some cases, it may be expected that the increase of activity (transmit (Tx)/receive (Rx) activity) on an AP may result in an increase in power consumption of the AP. However, it may also be expected that the increase of power consumption on a radio 112 of an AP 102 where a client STA 104 has roamed to may be less than the amount of energy saved by powering off the particular AP. Note, the energy consumption of an AP may be measured by the AP (e.g., powering debugging the AP) or from a power over Ethernet (PoE) switch (e.g., monitoring consumption on the PoE port).

In another embodiment, the DTO process uses an artificial intelligence (AI)/machine learning (ML) model, such as a deep neural network (DNN), as an illustrative, non-limiting example, to determine the MNT that allows for maintaining the target SLA for the set of applications (indicated by the policy engine 132) while maximizing the number of APs 102 that can be powered off. For example, the AI/ML model may be trained to minimize the energy consumption for all APs 102, e.g., using a global loss function or other type of gradient descent optimization algorithm. In another embodiment, the DTO process can use differential programming techniques (involving a set of functions that are continuous and differentiable) to determine the MNT that allows for maintaining the target SLA for the set of applications (indicated by the policy engine 132) while maximizing the number of APs 102 that can be powered off.

In yet another embodiment, the DTO process can use a predetermined set of actions to minimize the amount of energy consumption in the wireless network. Such a predetermined set of actions may be less disruptive than powering off one or more APs 102. As a reference example, the predetermined set of actions may include at least one of: (i) shutting down and switching radio chains (e.g., switching from 8×8 to 4×4, switching from 8×8 or from 4×4 to 2×2, switching from 8×8 or from 4×4 or from 2×2 to 1×1, or some other combination), (ii) shutting down unused extensions (e.g., USB ports), or reducing the AP's power (e.g., reducing from 23 decibel per milliwatts (dBm) to 11 dBm) when cell overlap permits. In some cases, while such actions (on an individual AP level) may not result in the same reduction in energy consumption as powering down the AP, when such actions are performed at scale (e.g., for multiple APs), the total amount of reduction in energy consumption may be significant.

In certain embodiments, the logging tool 138 is configured to record or log the energy savings within the network due to the DTO process. In one embodiment, the logging tool 138 may record energy consumption for each state of the network, where the state is represented by a vector of binary values for each AP (e.g., 1: power on, 0: power off). In one embodiment, the logging tool 138 may record, for each state of the network, the percentage of traffic for which the target SLA(s) for the applications of interest are met. The logging tool 138 may transmit an indication of the recorded information (e.g., network state along with the percentage of traffic that satisfies the target SLA) to a network operator, allowing the network operator to determine whether to adjust the DTO process, policy engine, and other components of the controller 130.

Figure 3:
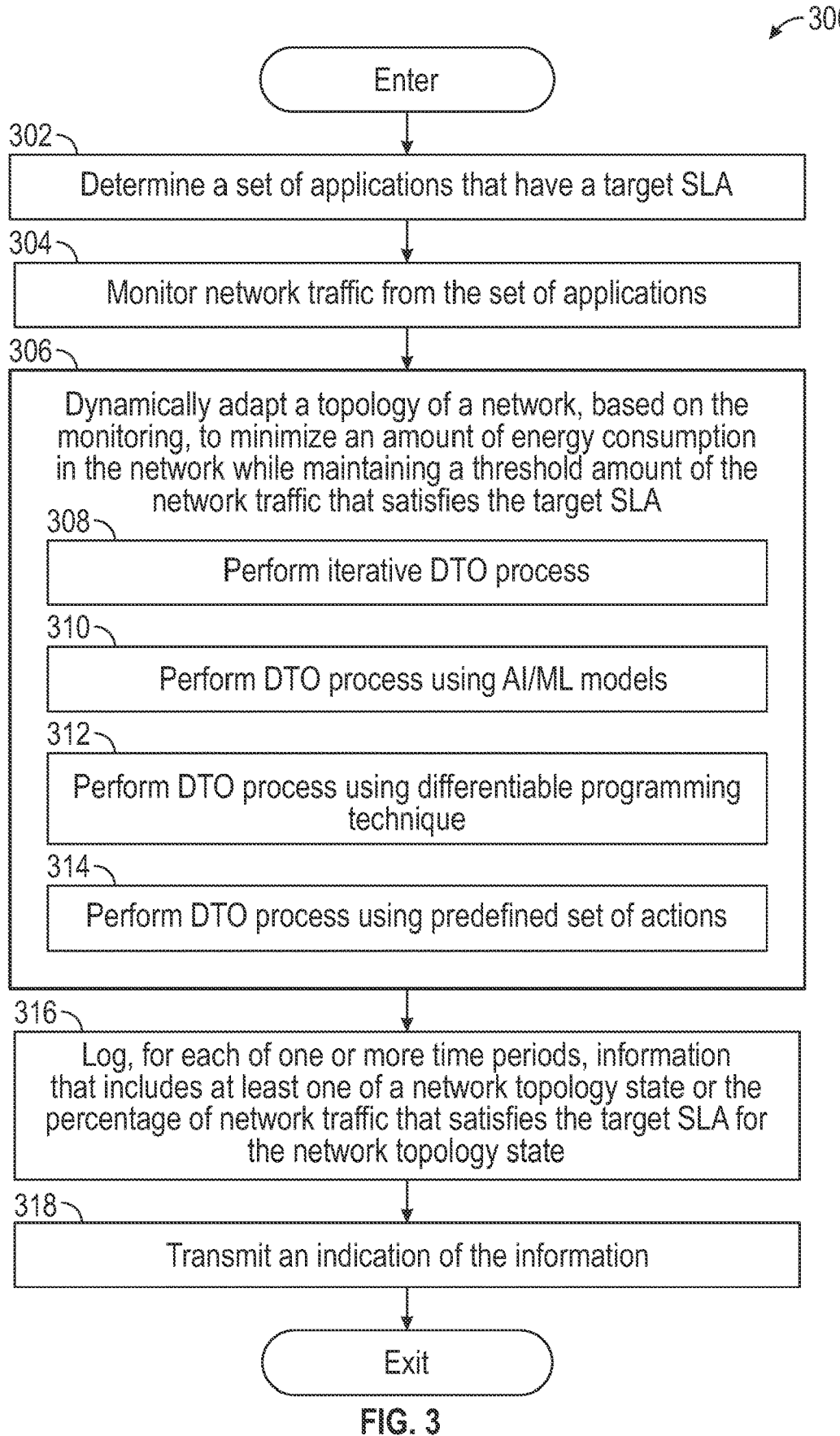
FIG. 3 is a flowchart of a method for dynamically optimizing a wireless network topology, according to one embodiment.

FIG. 3 is a flowchart of a method 300 for dynamically optimizing a wireless network topology (e.g., wireless network topology 200) to minimize energy consumption while preserving user quality of experience (QoE), according to one embodiment. The method 300 may be performed by a computing device, such as the controller 130 or AP 102.

Method 300 enters at block 302, where the computing device determines a set of applications that have a target SLA. The set of applications may be applications running on one or more client STA(s) associated with a set of APs (e.g., APs 102) deployed within an environment (e.g., wireless network topology 200). In certain embodiments, the computing device may perform the operations of block 302 using the policy engine 132 described herein.

At block 304, the computing device monitors network traffic from the set of applications. In certain embodiments, the computing device may perform the operations of block 304 using the monitoring component 134. For example, as noted herein, the monitoring component can monitor the SLA(s) for the set of applications indicated by the policy engine 132 using a variety of techniques to determine whether the target SLA(s) is met.

At block 306, the computing device dynamically adapts the wireless network topology, based on the monitoring, to minimize the amount of energy consumption in the network, while maintaining a predetermined threshold amount of the network traffic that satisfies the target SLA. As part of the dynamic adaptation, the computing device may perform a DTO process to determine the MNT that allows for maintaining the target SLA for the set of applications, while maximizing the number of APs that can be powered off. The DTO process may be performed based on a predetermined time interval, occurrence of a predefined event, or a combination thereof. In certain embodiments, the computing device may perform the operations of block 306 using the DTO component 136. Block 306 may include one or more of or combination of sub-blocks 308, 310, 312, and 314.

At sub-block 308, the computing device performs an iterative DTO process to dynamically adapt the topology of the network. In one embodiment, the iterative DTO process includes iteratively adjusting a power of one or more of the set of APs within the wireless network topology over a period of time while the threshold amount of network traffic satisfies the target SLA. Adjusting the power of a given AP may include reducing the power of the AP to a non-zero power level or powering off the AP. In another embodiment, the iterative DTO process includes iteratively adjusting a power of one or more radios (e.g., radios 112) of one or more of the set of APs within the wireless network topology over a period of time while the threshold amount of traffic satisfies the target SLA. Adjusting the power of a given radio of an AP may include reducing the power of the radio to a non-zero power level or powering off the radio.

At sub-block 310, the computing device performs a DTO process with one or more AI/ML models to dynamically adapt the topology of the network. At sub-block 312, the computing device performs a DTO process that involves a differentiable programming technique to dynamically adapt the topology of the network.

At sub-block 314, the computing device performs a DTO process using a predefined set of actions to dynamically adapt the topology of the network. The predefined set of actions may include at least one of: (i) shutting down one or more radio chains of one or more of the set of APs, (ii) shutting down one or more radios of one or more of the set of APs, (iii) shutting down one or more unused ports of one or more of the set of APs, or (iv) reducing power of one or more of the set of APs.

At block 316, the computing device logs, for each of the one or more time periods, information that includes at least one of (i) a network topology state or (ii) the percentage of network traffic that satisfies the target SLA for the network topology state. At block 318, the computing device transmits an indication of the information. In certain embodiments, the computing device may perform the operations of block 316 and 318 using the logging tool 138.

Figure 4:
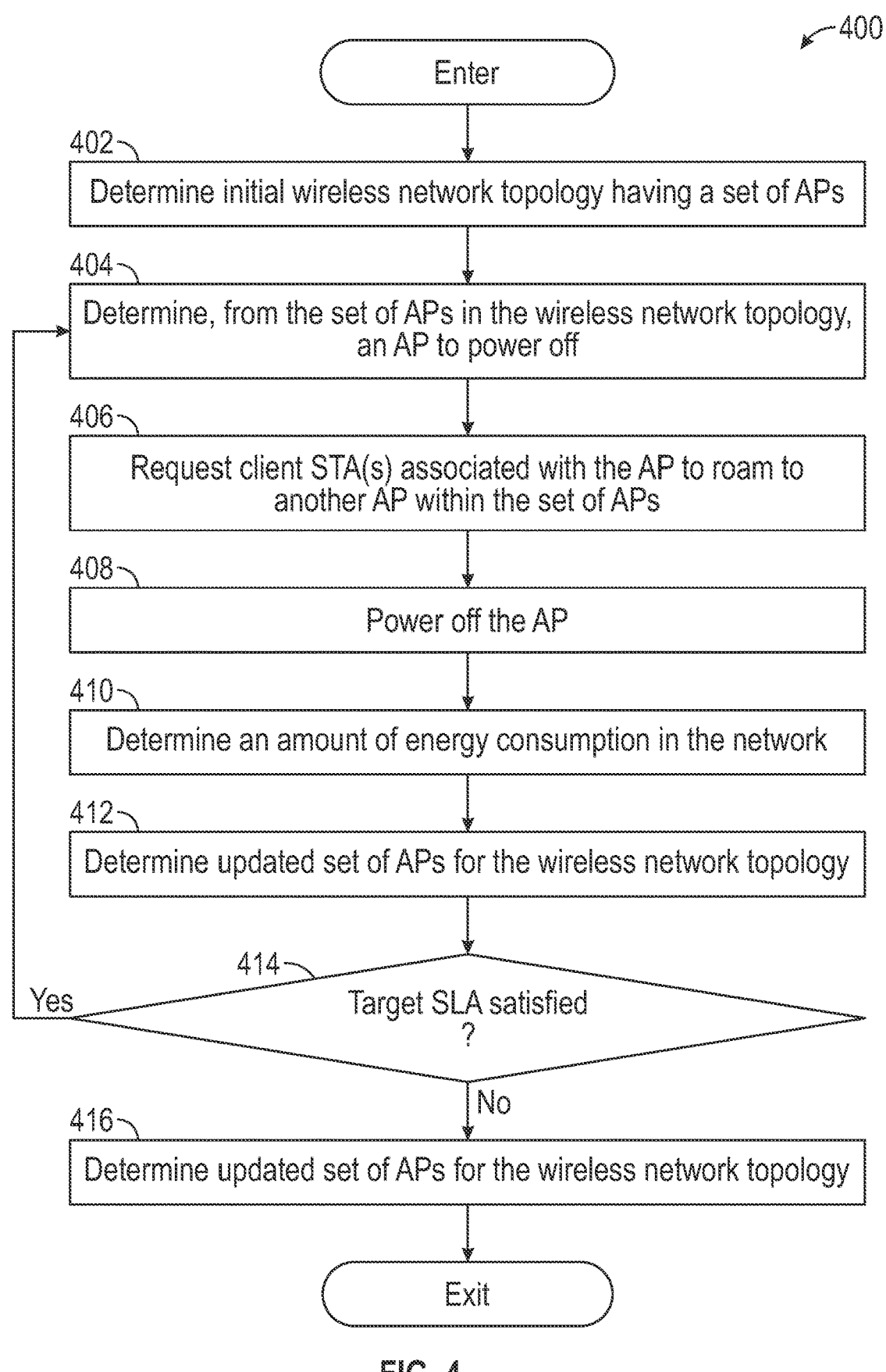
FIG. 4 is a flowchart of a method for performing a dynamic topology optimization process, according to one embodiment.

FIG. 4 is a flowchart of an example method 400 for performing a DTO process, according to one embodiment. The method 400 may be performed by a computing device, such as the controller 130 or AP 102. In one embodiment, the method 400 may be performed as part of the operations for block 306 of method 300 illustrated in FIG. 3.

Method 400 enters at block 402, where the computing device determines an initial wireless network topology having a set of APs (e.g., wireless network topology 200). In one embodiment, the initial wireless network topology includes a predetermined number of APs 102 that are powered on. In one example, this predetermined number of APs may include all APs of a network.

At block 404, the computing device determines, from the set of APs in the wireless network topology, an AP to power off. As noted herein, the computing device may determine which AP to power off, based on at least one of the number of client STAs 104 associated with that AP, the overlap of the measured cells 110, or energy consumption of the AP. In one embodiment, the computing device can use a trained AI/ML model to determine the particular AP to power off. In this embodiment, the trained AI/ML model may be trained to output the particular AP to power off to maintain the target SLA for the set of applications while minimizing the amount of energy consumption.

At block 406, the computing device requests client STA (s) associated with the determined AP to roam to another AP within the set of APs. Note, in certain embodiments, the roaming of client STA(s) to the other AP may result in an increase in power consumption of that AP (e.g., due to an increase in Tx/Rx activity on the AP). For instance, the AP may have to increase its transmission power in order to extend the range of its corresponding cell 110 to cover the additional client STA(s).

At block 410, the computing device determines an amount of energy consumption in the network. In certain embodiments, the operations in block 410 may also include saving and/or transmitting an indication of the amount of energy consumption in the network. At block 412, the computing device determines an updated set of APs for the wireless network topology. For example the updated set of APs may include a smaller number of APs that are powered on, compared to the number of APs in the set of APs at block 404.

At block 414, the computing device determines whether the target SLA is still satisfied (e.g., with the updated set of APs). If the target SLA is still satisfied, then the method 400 proceeds to block 404. If the target SLA is not satisfied, then the method 400 proceeds to block 416, where the computing device determines an updated set of APs for the wireless network topology. For example, in certain embodiments, the computing device may undo its action by powering on the last AP that was powered off in block 408, so that the target SLA is satisfied.

Note that while the computing device may perform one or more blocks of method 400 for each AP of a set of APs within a wireless network topology, in certain embodiments, the computing device may perform one or more blocks of method 400 for each radio of each AP of a set of APs within a wireless network topology.

Figure 5:
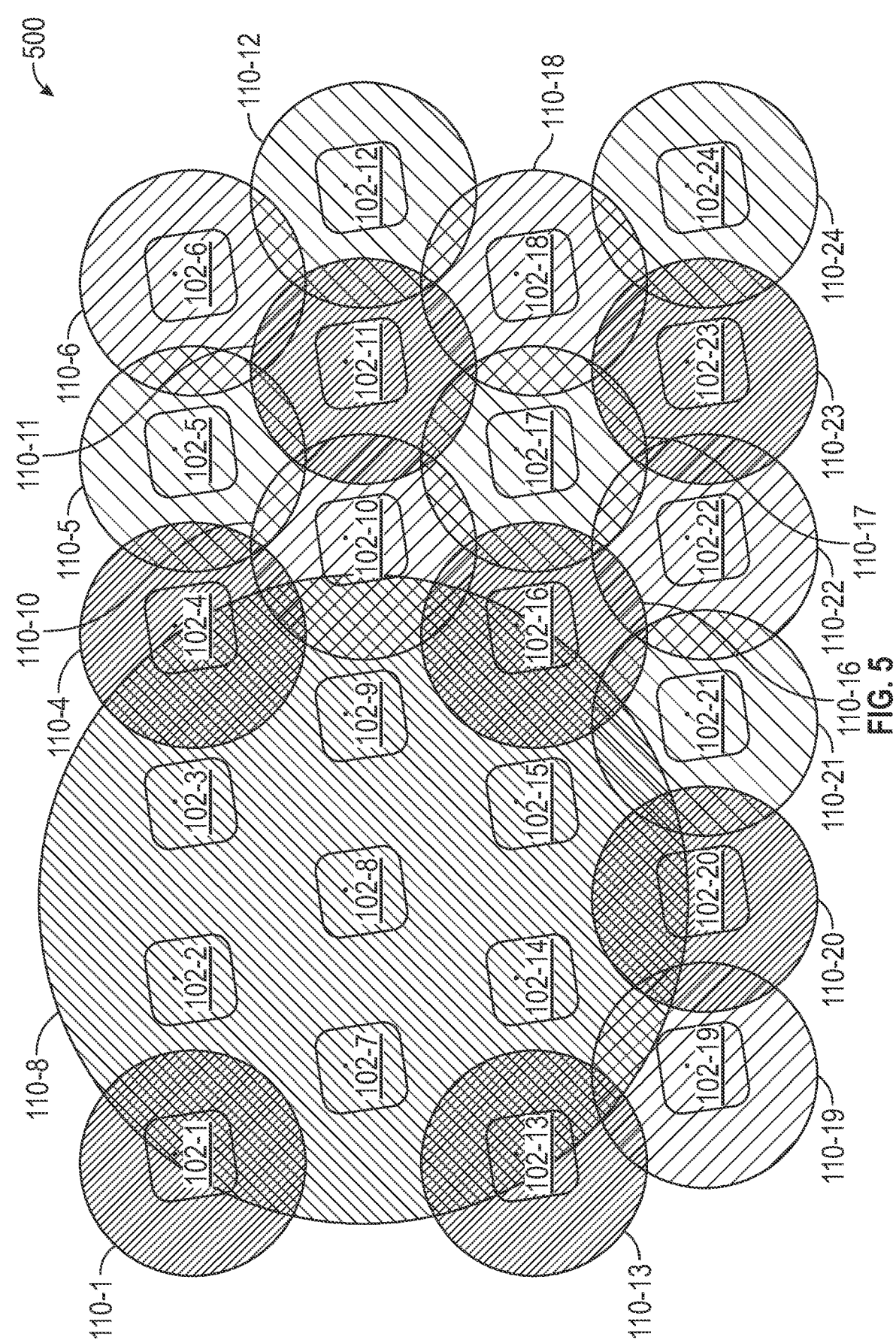
FIG. 5 illustrates an example optimized wireless network topology, according to one embodiment.

FIG. 5 illustrates an example optimized wireless network topology 500, according to one embodiment. Relative to the wireless network topology 200 depicted in FIG. 2, the optimized wireless network topology 500 is illustrative of a wireless network topology that has a minimum amount of energy consumption while preserving user QoE. In certain embodiments, the optimized wireless network topology 500 may be achieved by optimizing the wireless network topology 200 according to one or more techniques described herein.

As shown in FIG. 5, the wireless network topology 500 includes the same number of deployed APs as wireless network topology 200 (e.g., APs 102 1-24). However, compared to the wireless network topology 200, APs 102-2, 102-3, 102-7, 102-9, 102-14, and 102-15 have been powered off. Additionally, compared to the wireless network topology 200, the cell 110-8 of AP 102-8 has been extended to cover any client STA(s) 104 previously associated with one or more of the APs 102-2, 102-3, 102-7, 102-9, 102-14, and 102-15. As noted above, while the energy consumption of AP 102-8 in wireless network topology 500 may be higher than the energy consumption of AP 102-8 in wireless network topology 200, the overall amount of energy consumption of the wireless network topology 500 is less than the overall amount of energy consumption of the wireless network topology 200.

Figure 6:
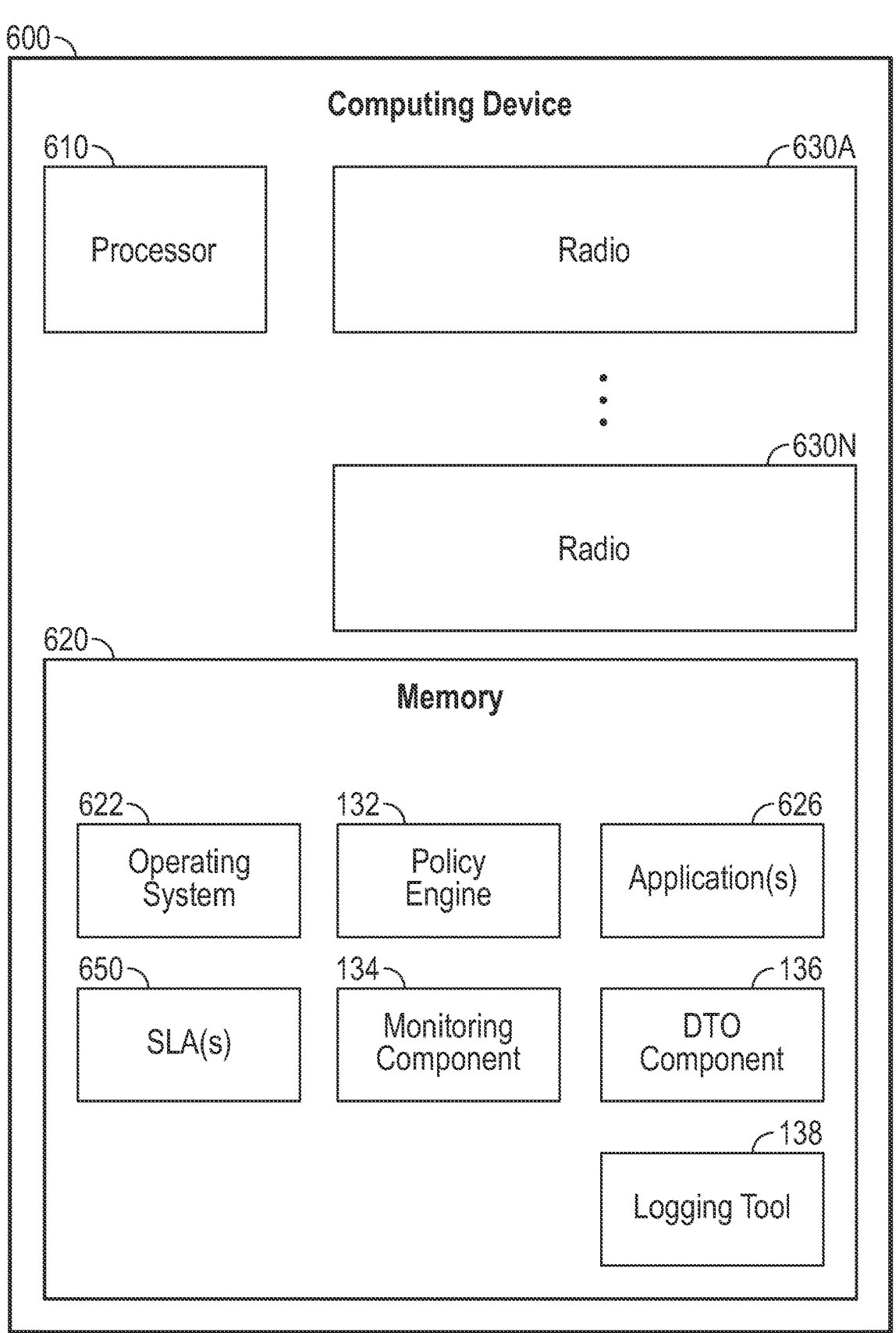
FIG. 6 illustrates an example computing device, according to one embodiment.

FIG. 6 illustrates an example computing device 600, according to one embodiment. The computing device 600 can be configured to perform one or more techniques described herein for dynamically optimizing a wireless network topology to minimize energy consumption while preserving user QoE. For example, the computing device 600 can perform method 300, method 400, and any other techniques (or combination of techniques) described herein. The computing device 600 can be an AP (e.g., AP 102) or a controller (e.g., controller 130). The computing device 600 includes a processor 610, a memory 620, and one or more radios 630*a-n* (generally, radio 630).

The processor 610 may be any processing element capable of performing the functions described herein. The processor 610 represents a single processor, multiple processors, a processor with multiple cores, and combinations thereof. The radios 630 facilitate communications between the computing device 600 and other devices. The radios 630 are representative of communication interferences, such as wireless communications antennas and various wired communication ports. The memory 620 may be either volatile or non-volatile memory and may include RAM, flash, cache, disk drives, and other computer readable memory storage devices. Although shown as a single entity, the memory 620 may be divided into different memory storage elements such as RAM and one or more hard disk drives.

As shown, the memory 620 includes various instructions that are executable by the processor 610 to provide an operating system 622 to manage various functions of the computing device 600. The memory 620 also includes a policy engine 132, a monitoring component 134, a DTO component 136, and a logging tool 138, which are described in greater detail above. The memory 620 further includes one or more application(s) 626 and one or more (target) SLA(s) 650 associated with the application(s) 626.

Advantageously, embodiments described herein provide techniques and systems for dynamically optimizing a wireless network topology to minimize energy consumption while preserving user QoE. The systems and techniques described herein can be used to dynamically adapt a wireless network topology by powering off (or reducing the power of) one or more APs deployed within an environment while maintaining a target SLA for one or more applications running on one or more client STAs. By adapting the wireless network topology in this manner, embodiments described herein can significantly reduce the energy consumption of the wireless network without compromising the performance of applications running on the client STAs.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," or "at least one of A or B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A computer-implemented method comprising:
   determining a set of applications that has a target service level agreement (SLA);
   monitoring network traffic from the set of applications being executed by one or more client stations (STAs) within a network;
   dynamically adapting a topology of the network to reduce an amount of energy consumption in the network while maintaining a threshold amount of the network traffic that satisfies the target SLA, based on monitoring the network traffic; and
   transmitting an indication of the amount of energy consumption in the network after dynamically adapting the topology of the network.

2. The computer-implemented method of claim 1, wherein dynamically adapting the topology of the network comprises iteratively adjusting a power of one or more of a set of access points (APs) within the network over a period of time while the threshold amount of network traffic satisfies the target SLA.

3. The computer-implemented method of claim 2, wherein adjusting the power of the one or more of the set of APs comprises reducing the power of the one or more of the set of APs to a non-zero power level or powering off the one or more of the set of APs.

4. The computer-implemented method of claim 1, wherein dynamically adapting the topology of the network comprises iteratively adjusting a power of one or more radios of one or more of a set of access points (APs) within the network over a period of time while the threshold amount of network traffic satisfies the target SLA.

5. The computer-implemented method of claim 1, wherein dynamically adapting the topology of the network comprises:
   determining a maximum number of a set of access points (APs) within the network that can be powered off while maintaining the threshold amount of network traffic that satisfies the target SLA; and
   powering off each AP in the determined maximum number of the set of APs.

6. The computer-implemented method of claim 5, wherein the maximum number of the set of APs that can be powered off while maintaining the threshold amount of network traffic that satisfies the target SLA is determined using one or more machine learning models.

7. The computer-implemented method of claim 5, wherein the maximum number of the set of APs that can be powered off while maintaining the threshold amount of network traffic that satisfies the target SLA is determined using a set of functions that are continuous and differentiable.

8. The computer-implemented method of claim 5, wherein the maximum number of the set of APs that can be powered off while maintaining the threshold amount of network traffic that satisfies the target SLA is determined using a set of predefined actions.

9. The computer-implemented method of claim 8, wherein the set of predefined actions comprises at least one of: (i) shutting down one or more radio chains of one or more of the set of APs, (ii) shutting down one or more radios of one or more of the set of APs, (iii) shutting down one or more unused ports of one or more of the set of APs, or (iv) reducing power of one or more of the set of APs.

10. The computer-implemented method of claim 1, wherein the topology of the network is dynamically adapted based on a predetermined time period.

11. The computer-implemented method of claim 1, wherein the topology of the network is dynamically adapted based on one or more events.

12. The computer-implemented method of claim 11, wherein the one or more events comprises detecting that a number of the one or more client STAs that are active is below a threshold.

13. The computer-implemented method of claim 12, wherein the threshold is associated with a time period.

14. The computer-implemented method of claim 11, wherein the one or more events comprises detecting that a number of the one or more client STAs using the set of applications is below a threshold.

15. A computing device comprising:
   memory; and
   a processor communicatively coupled to the memory, the processor being configured to perform an operation comprising:
   determining a set of applications that has a target service level agreement (SLA);
   monitoring network traffic from the set of applications being executed by one or more client stations (STAs) within a network;
   dynamically adapting a topology of the network to reduce an amount of energy consumption in the network while maintaining a threshold amount of the network traffic that satisfies the target SLA, based on monitoring the network traffic; and
   transmitting an indication of the amount of energy consumption in the network after dynamically adapting the topology of the network.

16. The computing device of claim 15, wherein dynamically adapting the topology of the network comprises iteratively adjusting at least one of (i) a power of one or more of a set of access points (APs) within the network or (ii) a power of one or more radios of one or more of the set of APs over a period of time while the threshold amount of network traffic satisfies the target SLA.

17. The computing device of claim 15, wherein dynamically adapting the topology of the network comprises:
   determining a maximum number of a set of access points (APs) within the network that can be powered off while maintaining the threshold amount of network traffic that satisfies the target SLA; and
   powering off each AP in the determined maximum number of the set of APs.

18. A computer-readable storage medium comprising computer executable code, which when executed by one or more processors, performs an operation comprising:
   determining a set of applications that has a target service level agreement (SLA);
   monitoring network traffic from the set of applications being executed by one or more client stations (STAs) within a network;
   dynamically adapting a topology of the network to reduce an amount of energy consumption in the network while maintaining a threshold amount of the network traffic that satisfies the target SLA, based on monitoring the network traffic; and
   transmitting an indication of the amount of energy consumption in the network after dynamically adapting the topology of the network.

19. The computer-readable storage medium of claim 18, wherein dynamically adapting the topology of the network comprises iteratively adjusting at least one of (i) a power of one or more of a set of access points (APs) within the network or (ii) a power of one or more radios of one or more of the set of APs over a period of time while the threshold amount of network traffic satisfies the target SLA.

20. The computer-readable storage medium of claim 18, wherein dynamically adapting the topology of the network comprises:
   determining a maximum number of a set of access points (APs) within the network that can be powered off while maintaining the threshold amount of network traffic that satisfies the target SLA; and
   powering off each AP in the determined maximum number of the set of APs.

* * * * *